United States Patent
Overhoff et al.

(10) Patent No.: US 9,068,490 B2
(45) Date of Patent: Jun. 30, 2015

(54) REDUCING AGENT INJECTION NOZZLE

(75) Inventors: Werner Overhoff, Marl (DE); Sascha Dolenec, Holzwickede (DE); Sebastian Muhlenbrock, Datteln (DE)

(73) Assignee: Albonair GmbH, Dortmund (DE)

( * ) Notice: Subject to any disclaimer, the term of this patent is extended or adjusted under 35 U.S.C. 154(b) by 0 days.

(21) Appl. No.: 14/004,971

(22) PCT Filed: Jan. 27, 2012

(86) PCT No.: PCT/EP2012/000373
§ 371 (c)(1),
(2), (4) Date: Sep. 25, 2013

(87) PCT Pub. No.: WO2012/123051
PCT Pub. Date: Sep. 20, 2012

(65) Prior Publication Data
US 2014/0007558 A1    Jan. 9, 2014

(30) Foreign Application Priority Data
Mar. 15, 2011  (DE) .......................... 10 2011 014 026

(51) Int. Cl.
*F01N 3/00* (2006.01)
*F01N 3/10* (2006.01)
(Continued)

(52) U.S. Cl.
CPC ................. *F01N 3/10* (2013.01); *F01N 3/2066* (2013.01); *F01N 2610/14* (2013.01); *F01N 2610/1453* (2013.01); *F01N 2610/1466* (2013.01); *F01N 2610/1473* (2013.01);
(Continued)

(58) Field of Classification Search
CPC .................... F01N 2610/14; F01N 2610/1453; F01N 2610/1466; F01N 2610/1473; F01N 2610/1493; F01N 3/10; F01N 3/2066; F23J 15/003; F23J 2219/10; Y02T 10/24
USPC ............................................ 60/286, 295, 303
See application file for complete search history.

(56) References Cited

U.S. PATENT DOCUMENTS

| | | | |
|---|---|---|---|
| 5,447,142 A * | 9/1995 | Bailey | 123/527 |
| 6,209,315 B1 * | 4/2001 | Weigl | 60/274 |
| 6,550,250 B2 * | 4/2003 | Mikkelsen et al. | 60/685 |

(Continued)

FOREIGN PATENT DOCUMENTS

| DE | 442527 | 3/1927 |
|---|---|---|
| DE | 839 283 | 5/1952 |

(Continued)

OTHER PUBLICATIONS

Search report issued Mar. 15, 2011 by the German Patent Office.
(Continued)

*Primary Examiner* — Thomas Denion
*Assistant Examiner* — Diem Tran
(74) *Attorney, Agent, or Firm* — Law Offices of Robert F. Zielinski LLC

(57) ABSTRACT

The invention relates to an injection nozzle (1) for injection of a reducing agent into an exhaust gas system (2) of an internal combustion engine for selective catalytic reduction, especially for atomization by means of compressed air or propellant gas, the nozzle (1) having at least one outlet opening, the nozzle (1) upstream of the outlet opening having a variable volume (8) which after completion of injection of the liquid is increased in order to draw gas from the vicinity (2) through the outlet opening into the nozzle (1).

16 Claims, 1 Drawing Sheet

(51) Int. Cl.
*F01N 3/20* (2006.01)
*F23J 15/00* (2006.01)

(52) U.S. Cl.
CPC ...... *F01N 2610/1493* (2013.01); *F23J 15/003* (2013.01); *F23J 2219/10* (2013.01); *Y02T 10/24* (2013.01)

(56) References Cited

U.S. PATENT DOCUMENTS

| | | | |
|---|---|---|---|
| 7,454,898 B2* | 11/2008 | Allgeier et al. | 60/286 |
| 7,958,912 B2* | 6/2011 | Levin | 141/50 |
| 2007/0186543 A1 | 8/2007 | Bakaj et al. | |
| 2010/0115932 A1 | 5/2010 | Kassel et al. | |

FOREIGN PATENT DOCUMENTS

| | | |
|---|---|---|
| DE | 888 038 | 8/1953 |
| DE | 198 19 579 C1 | 9/1999 |
| DE | 10 2004 050 023 A1 | 10/2004 |
| WO | WO 2004 047963 A1 | 6/2004 |

OTHER PUBLICATIONS

International Search Report issued May 16, 2012 by the European Patent Office.

* cited by examiner

REDUCING AGENT INJECTION NOZZLE

The invention relates to an injection nozzle for injection of a reducing agent into an exhaust gas system of an internal combustion engine for selective catalytic reduction, especially for atomization by means of compressed air or propellant gas, the nozzle having a nozzle body and at least one outlet opening, wherein the nozzle upstream of the outlet opening has a variable volume which after completion of injection of the liquid is increased in order to draw gas from the vicinity through the outlet opening into the nozzle.

Furthermore the invention relates to a method for operating an exhaust gas aftertreatment system with a injection nozzle with at least one outlet opening for injection of a reducing agent into an exhaust gas stream of an internal combustion engine for selective catalytic reduction.

These injection nozzles are known and are used in metering systems for injection of a reducing agent, such as a urea solution, especially according to DIN 70070, into the exhaust gas stream of an internal combustion engine. Metering systems for delivery of a reducing agent into the exhaust gas stream for selective catalytic reduction of nitrogen oxides (SCR) are used to minimize nitrogen oxide emissions from internal combustion engines. To do this, a reducing agent is injected into the exhaust gas system with a metering device. Ammonia is the reducing agent. In this sense a reducing agent or urea solution is to be understood as ammonia and also urea solution or another reductively acting agent and especially so-called AdBlue, i.e. a urea solution according to DIN 70070.

In these exhaust gas systems a reducing agent such as for example a urea solution is injected by means of compressed air into the exhaust gas stream and atomized in order to form an aerosol which is as fine and uniformly distributed as possible. The reducing agent is used for selective catalytic reduction (SCR) in so-called SCR catalytic converters for reduction of nitrogen oxide emissions from diesel engines.

After completion of reducing agent injection, residues of the reducing agent solution must be removed from the nozzle in order to prevent their crystallizing and clogging the outlet opening of the nozzle.

For this purpose installation of an additional compressed air line is known in order to blow the nozzle free by means of compressed air after completion of reducing agent injection.

The disadvantage here is that a large number of individual parts must be installed and connected, especially an additional compressed air line and corresponding valves which must be triggered in order to blow the nozzle free after completion of the reducing agent injection by means of compressed air. As a result, a large number of individual parts such as lines and valves must be installed, connected and triggered in operation.

Proceeding from this prior art, the object of the invention is to reduce the installation effort of the components which are to be installed in the exhaust gas system and thus to cut production costs. Another object is that in the production of the exhaust gas aftertreatment system fewer parts need be installed and the installation space is optimized. Furthermore a simple and reliable operating method for this injection nozzle will be made available which works without additional lines and valves.

This object is achieved as claimed in the invention by an injection nozzle as claimed in Claim 1 and a method as claimed in Claim 10. Advantageous developments of the device are given in the dependent claims.

In the injection nozzle for injection of a reducing agent in an exhaust gas system of an internal combustion engine for selective catalytic reduction, especially for atomization by means of compressed air or propellant gas, the nozzle having at least one outlet opening it is especially advantageous that the nozzle upstream of the outlet opening has a variable volume which after completion of injection of the liquid is increased in order to draw gas from the vicinity through the outlet opening into the nozzle.

By the arrangement of a variable volume in the flow direction of the reducing agent upstream of the outlet opening of the nozzle the nozzle opening and the channel which lies behind are aerated after completion of reducing agent injection and residues of reducing agent are removed which could otherwise crystallize out and clog the nozzle.

The heart of the invention is thus an arrangement of a variable volume and its enlargement to aerate the outlet opening and the flow channel of the nozzle.

Preferably the variable volume is delimited by a position-variable, especially flexible element, especially a membrane, a piston, a spring-loaded piston or the like which can be deflected out of its rest position in order to reduce the variable volume, and which has reset forces to automatically return to its rest position in order to increase the variable volume.

Preferably the variable volume is delimited by a flexible element which during injection of the liquid is deflected out of its rest position to reduce the variable volume, after completion of the injection of the liquid the flexible element returning to its rest position and increasing the variable volume.

The position-variable element is thus in the position to reversibly move back into its rest position by its reset forces, the volume which is delimited by the position-variable element and which is located upstream of the nozzle outlet opening being larger in the rest position of the element than for a position-variable element which has been deflected out of its rest position.

Since the enclosed volume in the rest position of the limiting element is larger than in its position deflected during metering operation, after completion of the injection of the reducing agent exhaust gas from the exhaust gas line is drawn into the nozzle through the nozzle opening and the nozzle is automatically aerated and reducing agent removed.

Due to its reset forces, the position-variable element which delimits the variable volume returns to its rest position and in this way increases the variable volume accordingly.

Especially preferably the variable volume is delimited by a flexible element while during injection of the liquid is exposed to the compressed air which is used to atomize the liquid and is deflected out of its rest position in order to reduce the variable volume.

By using compressed air which is supplied to the nozzle for atomization of the reducing agent solution, the overall design is especially advantageous since the separate feed of a pressurized fluid can be omitted and the feed lines for compressed air and reducing agent discharge into a compact nozzle body and are connected to it. In the nozzle body is the variable volume which is delimited by a position-variable flexible element, and downstream of the volume is the outlet opening for reducing agent so that a compact unit is formed.

Alternatively or cumulatively to the use of compressed air, the variable volume can be delimited by a flexible element which during injection of the liquid is exposed to a pressurized fluid of the internal combustion engine, especially oil or fuel or cooling liquid, and is deflected out of its rest position in order to reduce the variable volume.

To pressurize the flexible element which delimits the variable volume any pressurized fluid can be used, preferably those which are available in operation of an internal combustion engine, such as especially lubricant, fuel or coolant.

In one preferred embodiment the variable volume is delimited by a flexible element which during injection of the liquid is electromagnetically deflected out of its rest position in order to reduce the variable volume.

By using an electromagnet to deflect the position-variable element which delimits the variable volume, cumulatively or alternatively to using a pressurized fluid an exactly controllable deflection of the flexible element and thus setting of the desired volume or inducing the desired volume change can be carried out.

Especially preferably the outlet opening of the nozzle is located geodetically above the variable volume.

In this way lagging of the liquid can be reliably prevented by the nozzle being located above the variable volume.

Preferably it is a binary nozzle in which the liquid is atomized by means of compressed air, the nozzle in addition to the outlet opening for the liquid having at least one further outlet opening for compressed air, in particular that the outlet opening for compressed air is located circularly concentrically to the outlet opening for liquid.

In one preferred embodiment the nozzle is made such that it is made as an externally mixing binary nozzle. For this purpose the nozzle in one especially preferred embodiment has at least one first nozzle opening and one second nozzle opening which are arranged to one another such that a reducing agent emerging through the first nozzle opening is atomized by means of the propellant gas such as compressed air emerging through the second nozzle opening and a homogeneous aerosol is formed outside the nozzle body.

One especially preferred arrangement of the two nozzle openings arises when the second opening is formed by an annular gap which is located concentrically to the first opening.

Thus it is possible to route the liquid to be atomized through the first nozzle opening and to route the compressed air or the propellant gas through the annular gap which concentrically surrounds this first nozzle opening so that when the liquid is ejected by the compressed air or the propellant gas the liquid is atomized and thus the required aerosol is formed. To do this, the two substances, reducing agent solution and compressed air/propellant gas, are routed to the nozzle on separate paths. Since in addition to compressed air also any other propellant gas can be used for atomization of the liquid, compressed air in this sense is used as a synonym for any propellant gas.

Preferably urea solution especially according to DIN 70070 is used as the reducing agent which is to be atomized for selective catalytic reduction. The basic principle of the nozzle in this especially preferred embodiment is thus aerosol formation outside of the nozzle.

The injection nozzle can be made in one piece. For this reason the nozzle can be produced by means of a metal powder injection molding method. Here the required cavities during injection of the part are formed by one or more plastic bodies, these plastic bodies vaporizing in subsequent release.

The nozzle is made in several parts in one alternative embodiment.

Preferably the nozzle is made in two parts or several parts, a first part having a first nozzle opening, and a second part at least partially surrounding the first part so that a second nozzle opening is formed between the first and second part.

At the same time, between the two parts the annular gap which forms the second opening and which concentrically encompasses the first nozzle opening, i.e. forms a ring which is concentric to the first circular nozzle opening, can be formed by this configuration in which the second part at least partially surrounds or encompasses the first part.

Instead of a concentric ring, several individual small openings can also surround the first nozzle opening, via the plurality of second openings the compressed air or the propellant gas being discharged in order to atomize the liquid emerging from the first nozzle opening and to form the required aerosol.

The parts can be cemented to one another in a multi-part execution of the nozzle.

Preferably the nozzle on the outside, i.e. especially in the direction to the exhaust gas stream, in the installed state has a thermal insulation layer. In particular the nozzle can have a ceramic coating. In this way the nozzle is effectively protected against heat, as occurs in the exhaust gas line of an internal combustion engine.

Especially preferably the variable volume upstream of the outlet opening of the nozzle is integrated into a liquid line or into the nozzle body.

The variable volume can thus be integrated into a liquid feed line toward the nozzle within the overall arrangement upstream of the nozzle body and can form a part which can then be connected only to the delivery side of a metering pump and to the nozzle. The variable volume can be integrated into the nozzle body and/or into the line package.

In the integration of the variable volume into the nozzle body of the nozzle a very compact unit is formed which then can be connected to the pressure side of the metering pump of the exhaust gas aftertreatment unit solely via a liquid line. To the extent compressed air is used to atomize the reducing agent, it is sufficient to connect the compressed air line likewise to this compact unit.

This simplifies the installation of the system and ensures reliable operation with automatic aeration of the nozzle after completion of the reducing agent injection.

In the method for operation of an exhaust gas aftertreatment system with an injection nozzle with at least one outlet opening for injection of a reducing agent into an exhaust gas stream of an internal combustion engine for selective catalytic reduction, it is especially advantageous that after completion of injection a variable volume which is located upstream of the outlet opening is increased so that gas from the vicinity is drawn through the outlet opening into the nozzle and forces the reducing agent back.

In this way the nozzle is automatically aerated after completion of reducing agent injection. The reducing agent is removed from the nozzle so that crystallization of the reducing agent and a clogging of the nozzle are reliably stopped. Restart of the exhaust gas aftertreatment system with the nozzle for injection of reducing agent for selective catalytic reduction in an internal combustion engine is thus ensured at any time.

In one especially preferred embodiment the variable volume is reduced during injection by a flexible element which delimits the variable volume, especially a membrane or a spring-loaded piston or the like, being exposed to compressed air which is used for atomization of the reducing agent and being deflected out of its rest position, after completion of injection of the reducing agent the exposure to compressed air being ended and the flexible element returning reversibly to its rest position as a result of its reset forces and increasing the variable volume.

One exemplary embodiment of the injection nozzle as claimed in the invention is shown in the Figure and is detailed below.

FIG. 1a shows a schematic of an injection nozzle 1 for injection of a reducing agent into the exhaust gas stream 2 of an internal combustion engine for selective catalytic reduction during operation.

FIG. 1b shows the same arrangement after completion of the injection of the reducing agent.

Figure 1A:
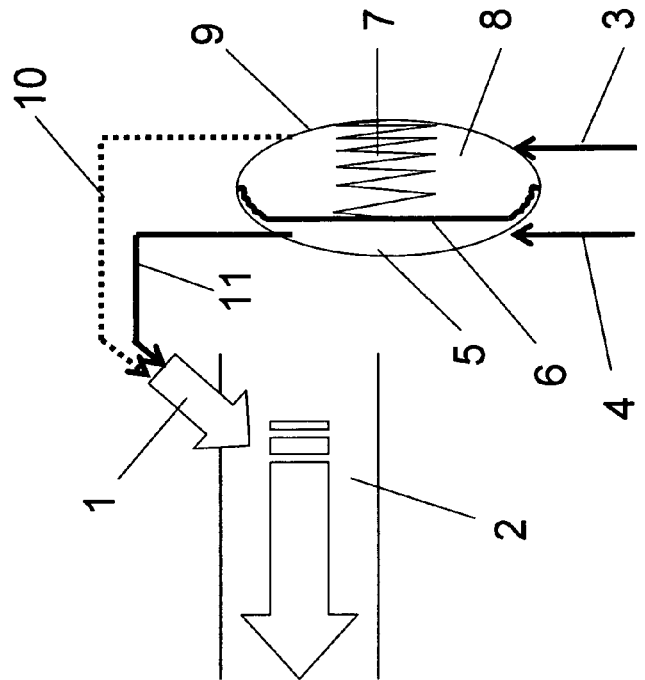
FIG. 1a shows a schematic of an injection nozzle with minimized variable volume during operation.

During operation, i.e. during injection of the reducing agent via the externally mixing binary nozzle 1 into the exhaust gas line 2 of an internal combustion engine for selective catalytic reduction, a reducing agent solution from a tank which is not shown is supplied by means of a metering pump to the nozzle 1 via the feed line 3. The reducing agent is atomized as it emerges from the nozzle 1 by means of compressed air which is supplied via the feed line 4.

A housing 9 which is divided into two variable volumes 5, 8 by a flexible membrane 6 which is pretensioned by means of a spring 7 is integrated into the line system 3, 4 of the arrangement as shown in FIG. 1.

The compressed air which is supplied via the feed line 4 is further supplied via the line 11 to the nozzle 1 for atomization of the reducing agent solution via the left side 5 within the housing 9.

The reducing agent solution which is supplied via the feed line 3 is routed further to the line 10 and furthermore to the nozzle 1 for injection into the exhaust gas line 2 via the right side 8 of the housing 9 which is separated by means of the membrane 6.

During injection operation as is shown in FIG. 1a, the membrane 6 is deflected out of its rest position due to on the prevailing air pressure in the chamber 5 against the force of the reset spring 7 out of its rest position. During operation the chamber 5 is enlarged as a result of the air pressure prevailing in the chamber 5 and the chamber 8 within the housing 9 is made smaller.

To deflect the membrane 6 against the spring force of the reset spring 7 thus the pressure of the air pressure is used which is supplied anyway via the line 4, the chamber 5 and the line 11 to the nozzle 1 in order to atomize the reducing agent when it emerges from the nozzle 1 in the exhaust gas line 2 and to form an aerosol.

The reset spring 7 in combination with the flexible membrane 6 is designed such that in the chamber 8 pulsation damping of the pressure surges takes place as result of the respective delivery stroke of the metering pump which is connected to the feed line 3, i.e. that pressure peaks are captured so that a uniform spray picture arises in the exhaust gas line 2 for the reducing agent which has been routed on via the line 10 to the nozzle 1.

Figure 1B:
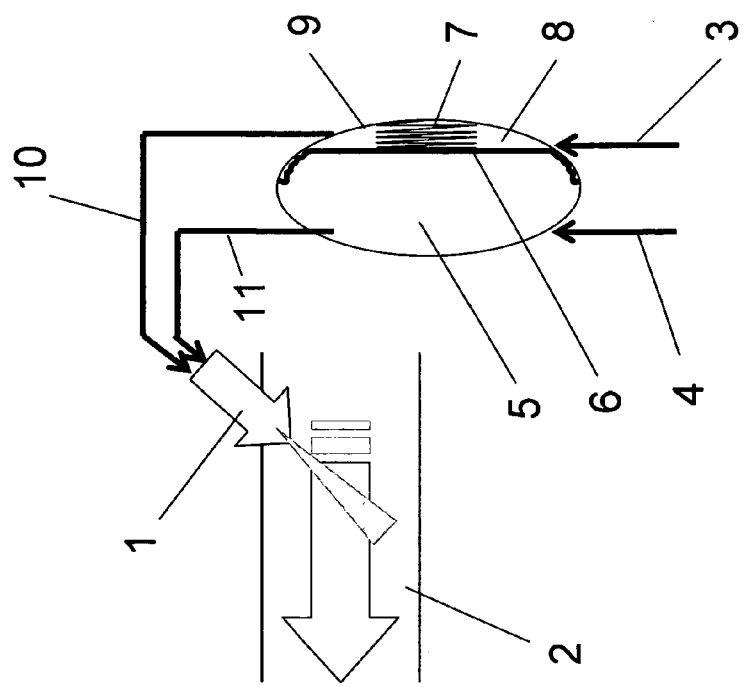
FIG. 1b shows a schematic of the injection nozzle with maximized variable volume after completion of operation.

FIG. 1b shows the situation after injection is turned off. With turning off the delivery of the reducing agent via the feed line 3 likewise the feed of compressed air via the feed line 4 into the chamber 5 is shut off, i.e. that at this point there is no longer any overpressure in the chamber 5. This leads to the fact that as a result of the spring force of the spring 7 the membrane 6 which divides the housing 9 into two chambers 5 and 8 migrates into its rest position as a result of the reset force; this leads to a reduction in the size of the chamber 5 and to a corresponding enlargement of the chamber 8 in the housing 9. Since the nozzle 1 and the feed line 10 which lies behind it are open toward the exhaust gas line 2, the increase of the variable volume 8 leads to the fact that exhaust gas is drawn out of the exhaust gas line 2 through the nozzle 1 and the reducing agent is removed from the nozzle 1 and the line section 10 and the nozzle and line section are deaerated by the intake of exhaust gas from the exhaust gas line 2, as is indicated by the broken-line representation of the line section 10.

By turning off the compressed air and resetting the membrane 6 due to the spring force of the spring 7 into the rest position, after completion of the injection of the reducing agent the nozzle 1 and the feed line 10 to the nozzle are automatically deaerated in order to avoid deposits. This ensures that the reducing agent injection arrangement can be restarted at any time since deposits are reliably prevented.

During restart, the situation as shown in FIG. 1a arises again since then in addition to the reducing agent pump by means of which the reducing agent is supplied via the line 3, compressed air is also delivered to the feed line 4 so that in the chamber 5 in turn the pressure of the compressed air is on the membrane 6 and deflects it out of its rest position and accordingly reduces the size of the variable volume 8 on the reducing agent-carrying side of the membrane 6.

The invention claimed is:

1. An injection nozzle (1) for injection of a reducing agent into an exhaust gas system (2) of an internal combustion engine for selective catalytic reduction, for atomization by means of compressed air or propellant gas, the nozzle (1) having at least one outlet opening, wherein the nozzle (1) upstream of the outlet opening has a variable volume (8) which after completion of injection of the liquid is increased in order to draw gas from the vicinity (2) through the outlet opening into the nozzle (1), wherein the variable volume (8) is delimited by a position-variable, flexible element (6), which can be deflected out of its rest position in order to reduce the variable volume (8), and which has reset forces to automatically return to its rest position in order to increase the variable volume (8), and wherein the variable volume (8) is delimited by a flexible element (6) which during injection of the liquid is deflected out of its rest position in order to reduce the variable volume (8), after completion of the injection of the liquid the flexible element (6) returning to its rest position and increasing the variable volume (8).

2. The nozzle (1) as claimed in claim 1 wherein the variable volume (8) is delimited by a flexible element which during injection of the liquid is exposed to compressed air which is used to atomize the liquid, and is deflected out of its rest position in order to reduce the variable volume (8).

3. The nozzle (1) as claimed in claim 1 wherein the variable volume 13 (8) is delimited by a flexible element which during injection of the liquid is exposed to a pressurized fluid of the internal combustion engine, especially lubricant or fuel or cooling liquid, and is deflected out of its rest position to reduce the variable volume (8).

4. The nozzle (1) as claimed in claim 1 wherein the variable volume (8) is delimited by a flexible element which during injection of the liquid is electromagnetically deflected out of its rest position in order to reduce the variable volume (8).

5. The nozzle (1) as claimed in claim 1 wherein the outlet opening is located geodetically above the variable volume (8).

6. The nozzle (1) as claimed in claim 1 wherein it is a binary nozzle in which the liquid is atomized by means of compressed air, the nozzle in addition to the outlet opening for the liquid having at least one further outlet opening for compressed air, wherein the outlet opening for compressed air is located circularly concentrically to the outlet opening for liquid.

7. The nozzle (1) as claimed in claim 1 wherein the variable volume (8) upstream of the outlet opening of the nozzle (1) is integrated into a liquid line (3, 10) or into the nozzle body.

8. The nozzle (1) as claimed in claim 1, wherein flexible element (6) is formed by a membrane, a piston, a spring-loaded piston.

9. The nozzle (1) as claimed in claim 8 wherein the variable volume (8) is delimited by a flexible element (6) which during injection of the liquid is deflected out of its rest position in order to reduce the variable volume (8), after completion of the injection of the liquid the flexible element (6) returning to its rest position and increasing the variable volume (8).

10. The nozzle (1) as claimed in claim 8 wherein the variable volume (8) is delimited by a flexible element which during injection of the liquid is exposed to compressed air which is used to atomize the liquid, and is deflected out of its rest position in order to reduce the variable volume (8).

11. The nozzle (1) as claimed claim 8 wherein the variable volume 13 (8) is delimited by a flexible element which during injection of the liquid is exposed to a pressurized fluid of the internal combustion engine, especially lubricant or fuel or cooling liquid, and is deflected out of its rest position to reduce the variable volume (8).

12. The nozzle (1) as claimed in claim 8 wherein the variable volume (8) is delimited by a flexible element which during injection of the liquid is electromagnetically deflected out of its rest position in order to reduce the variable volume (8).

13. The nozzle (1) as claimed in claim 8 wherein the outlet opening is located geodetically above the variable volume (8).

14. The nozzle (1) as claimed in claim 8 wherein it is a binary nozzle in which the liquid is atomized by means of compressed air, the nozzle in addition to the outlet opening for the liquid having at least one further outlet opening for compressed air, in particular wherein the outlet opening for compressed air is located circularly concentrically to the outlet opening for liquid.

15. The nozzle (1) as claimed in claim 8 wherein the variable volume (8) upstream of the outlet opening of the nozzle is integrated into a liquid line (3, 10) or into the nozzle body.

16. A method for operation of an exhaust gas after treatment system with an injection nozzle (1) with at least one outlet opening for injection of a reducing agent into an exhaust gas stream (2) of an internal combustion engine for selective catalytic reduction, characterized in that after completion of injection a variable volume (8) which is located upstream of the outlet opening is increased so that gas from the vicinity (2) is drawn through the outlet opening into the nozzle (1) and forces the reducing agent back, wherein the variable volume (8) is reduced during injection by a flexible element (6) which delimits the variable volume (8), especially a membrane or a spring-loaded piston, being exposed to compressed air which is used for atomization of the reducing agent and being deflected out of its rest position, after completion of injection of the reducing agent the exposure to compressed air being ended and the flexible element (6) returning reversibly to its rest position as a result of its reset forces and increasing the variable volume (8).

* * * * *